United States Patent [19]

Abel

[11] Patent Number: 5,552,044
[45] Date of Patent: Sep. 3, 1996

[54] APPARATUS FOR SEPARATING SOLID MATERIAL AND LIQUID

[76] Inventor: Gunther Abel, 8212 Alpine Way, Whistler British Columbia, Canada, V0N 1B0

[21] Appl. No.: 21,049

[22] Filed: Feb. 23, 1993

Related U.S. Application Data

[63] Continuation-in-part of Ser. No. 729,535, Jul. 15, 1991, Pat. No. 5,207,904.

[51] Int. Cl.⁶ .............................. C02F 1/40; B01D 21/00; B01D 36/00
[52] U.S. Cl. ..................... 210/252; 210/155; 210/157; 210/161; 210/203; 210/210; 210/217; 210/220; 210/256; 210/259; 210/297; 210/324; 210/403; 210/499; 210/525
[58] Field of Search .................... 210/155, 157, 210/158, 159, 161, 201, 203, 208, 210, 213, 217, 219, 220, 252, 256, 259, 297, 298, 308, 324, 327, 394, 403, 415, 499, 525, 528, 531; 425/377, 381.2, 382 R, 464, 202, 204; 209/667, 930

[56] References Cited

U.S. PATENT DOCUMENTS

| | | | |
|---|---|---|---|
| 3,015,396 | 1/1962 | Quast | 210/703 |
| 3,070,836 | 1/1963 | De Haven et al. | 425/204 |
| 3,121,680 | 2/1964 | Ciabattari | 210/703 |
| 3,447,486 | 6/1969 | Woodings et al. | 425/382 R |
| 3,862,594 | 1/1975 | Stölting et al. | 425/202 |
| 4,298,473 | 11/1981 | Wyman | 210/213 |
| 4,836,919 | 6/1989 | Huber | 210/158 |
| 5,006,236 | 4/1991 | Croket | 210/162 |
| 5,098,561 | 3/1992 | Grabbe | 210/155 |
| 5,110,461 | 5/1992 | Abel | 210/161 |
| 5,171,436 | 12/1992 | Botsch | 210/159 |
| 5,211,841 | 5/1993 | Krempp et al. | 210/403 |
| 5,268,111 | 12/1993 | Metz et al. | 210/208 |
| 5,296,136 | 3/1994 | Abel | 210/161 |

*Primary Examiner*—John Kim
*Attorney, Agent, or Firm*—Brian M. Long

[57] ABSTRACT

Apparatus for separating waste liquid and solid material comprises an upwardly inclined passage containing an auger for conveying the solid waste material upwardly along the passage, with an inlet opening at a lower end of the passage for receiving a mixture of waste liquid and solid material into the auger, a drainage opening at the lower end of the cylindrical passage for draining liquid from the solid waste conveyed by the auger, and a compactor for receiving the solid material fed upwardly by the auger and compacting the solid waste material. An extruder receives and extrudes the compacted solid waste material from the compactor, and may be arranged to convert the compacted material into pellets.

15 Claims, 14 Drawing Sheets

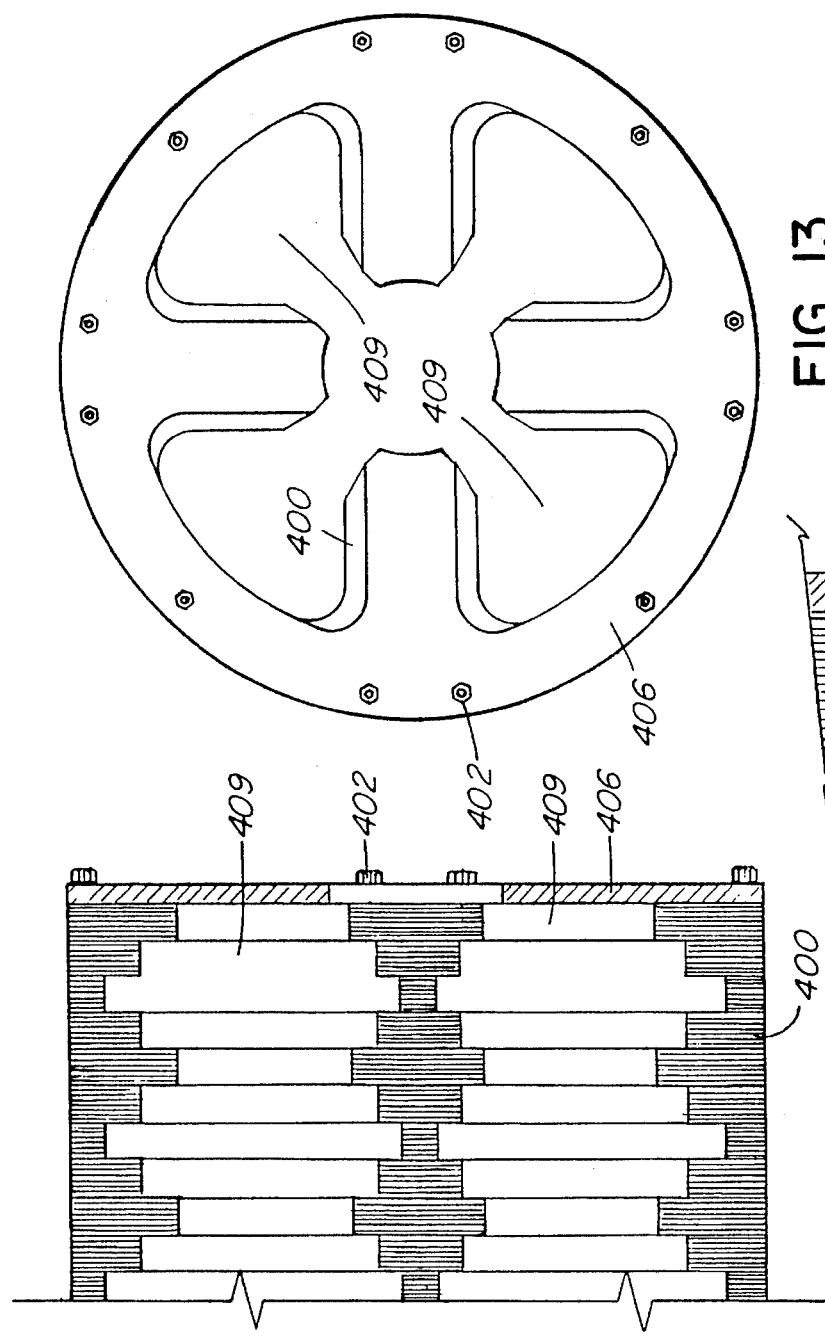
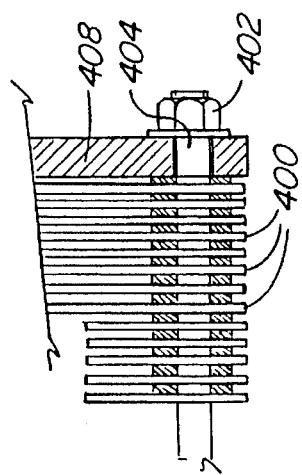
FIG. 13
FIG. 14
FIG. 12

APPARATUS FOR SEPARATING SOLID MATERIAL AND LIQUID

CROSS REFERENCE TO RELATED APPLICATION

This is a continuation-in-part of Ser. No. 07/729,535, filed Jul. 15, 1991, U.S. Pat. No. 5,207,904.

BACKGROUND OF THE INVENTION

1. Field of the Invention

The present invention relates apparatus for separating waste liquid and solid material and is useful, for example, for removing liquid from a mixture of biological waste material and sludge and compressing and extruding the thus-separated solid material.

More particularly, the present invention is useful, for example, for the treatment of biological waste and sludge by dewatering and composting to form fertilizer, and for the conversion of waste water into usable water or even into drinking water, and may be employed for the treatment of waste, in waste treatment plants, from municipal sewerage systems, industrial sewage treatment plants, and other sources of human and animal waste, for example slaughter houses, hospitals and other buildings, greenhouses and other agricultural installations. The present apparatus may be connected to or separate from sewers and is useful both in fixed installations and in mobile waste treatment apparatus.

2. Description of the Related Art

In the treatment of waste water, it is known to use a screen in the form of a cylindrical basket formed by axially-spaced circular bars to separated liquids and solids. The screen is disposed with its longitudinal axis inclined and a mixture of the liquids and solids is fed into the interior of the screen through the lower end of the cylindrical basket, which is open and is located at a suitable level in a waste water flow channel or the like.

An auger, which is co-axial with the screw, extends upwardly, through and beyond the upper end of the cylindrical basket, and is provided in a tube which, in the basket, has an opening in the top of the tube through which material screened by the basket can be deposited into the auger. The interior of the cylindrical basket is provided with a rake, which rotates around the basket to collect solid material caught on the interior of the bars and to deflect this material through the tube opening into the auger for conveyance by the auger along the tube to the upper end of the tube, where the solid material is discharged downwardly into, e.g., a truck or other container.

BRIEF SUMMARY OF THE INVENTION

It is an object of the present invention to provide a novel apparatus for separating solid and liquid materials which is equipped with improved means for processing the solid material after it has been deposited into the auger.

According to the present invention, there is provided apparatus for separating waste liquid and solid material, comprising an upwardly inclined passage, an auger in the passage for conveying the solid waste material upwardly along the passage, an inlet opening at a lower end of the passage for receiving a mixture of waste liquid and solid material into the auger, liquid drainage means at the lower end of the cylindrical passage for draining liquid from the solid waste conveyed by the auger, and a compactor for receiving the solid material fed upwardly by the auger and compacting the solid waste material.

The apparatus may include an extruder for receiving and extruding the compacted solid waste material from the compactor, and the extruder may be arranged to convert the compacted material into pellets.

The apparatus may be associated with prior art machinery and may be provided with various types of receiving or separating screens or baskets for coarse- to micro-filtration for the separation of solids and liquids of many different types. The solid material may, if required, be comminuted, compressed and dewatered in the compactor to about 45 percent solid material content and in the extruder, when utilized, to about 70 to 80 percent solid material content.

Also, a volume reduction of about two-thirds or more of the solid material may be obtained by the present apparatus.

The solid material treated by the present apparatus may be stored, burnt, composted or employed for energy producing heat exchange and for sterilizing the solid material during composting to about 75 degrees.

The apparatus may be inclined at an angle of 10–45 degrees or, for heavy duty separation, can be arranged at two angles, namely with a lower part of the apparatus inclined at 10–20 degrees to facilitate the greatest possible immersion of the basket, when employed, in the incoming mixture, and with an upper part, for discharging into containers, at about 30–45 degrees. In the latter case, if the solid material is formed into pellets, the pellets can be removed by a discharge auger having a single flight, a lightweight construction and an inclination of up to twice that of the lower portion of the apparatus.

The auger may be a double-flight auger, or may have a doubled flight pitch, as far as the compactor. Preferably, at least four shearing and guide rails are provided between the auger and a tube forming at least part of the cylindrical passage and a statically balanced pressure increase is obtained. Filtrate liquid may be fed back between the auger and the tube, and between the shearing and guide rails, through a filtrate outlet into a lower region of the apparatus for further treatment.

A variable pressure increase, and thus a variable solid material content of about 40 to 80 percent, are obtained by varying the shapes of the extrusion openings of the extruder.

The apparatus may be installed in an open or covered housing, with its inlet in a sand and sediment separator with a grating or the like for removing large stones and other dense, sinking objects, and with a further auger for removing the sediment into Containers, with a hopper for the solid material.

The apparatus may have a first, lower cylindrical separator screen or basket with a bar spacing up to 0.5 mm and a second, upper cylindrical separator screen or basket having a microscreen, for separating coarse to fine solid material from liquids or sludges. By mans of the micro-screen, even bacteria can be removed, so that, for example, water thus filtered can be of potable quality.

The present apparatus can be employed in communal purification plants and industrial purification and processing plants of various types.

BRIEF DESCRIPTION OF THE DRAWINGS

Various features, objects and advantages of the present invention will be more readily apparent from the following description of an embodiment thereof given, by way of example, with reference to the accompanying drawings, in which;

FIG. 12 shows a broken-away view, in longitudinal cross-section, through a cylindrical screen or basket for use in the apparatuses of FIGS. 1 through 11;

FIG. 13 shows an end view of the screen of FIG. 12;

FIG. 14 shows an enlarged portion of the cross-sectional view of FIG. 12;

THE PREFERRED EMBODIMENT

Figure 1:
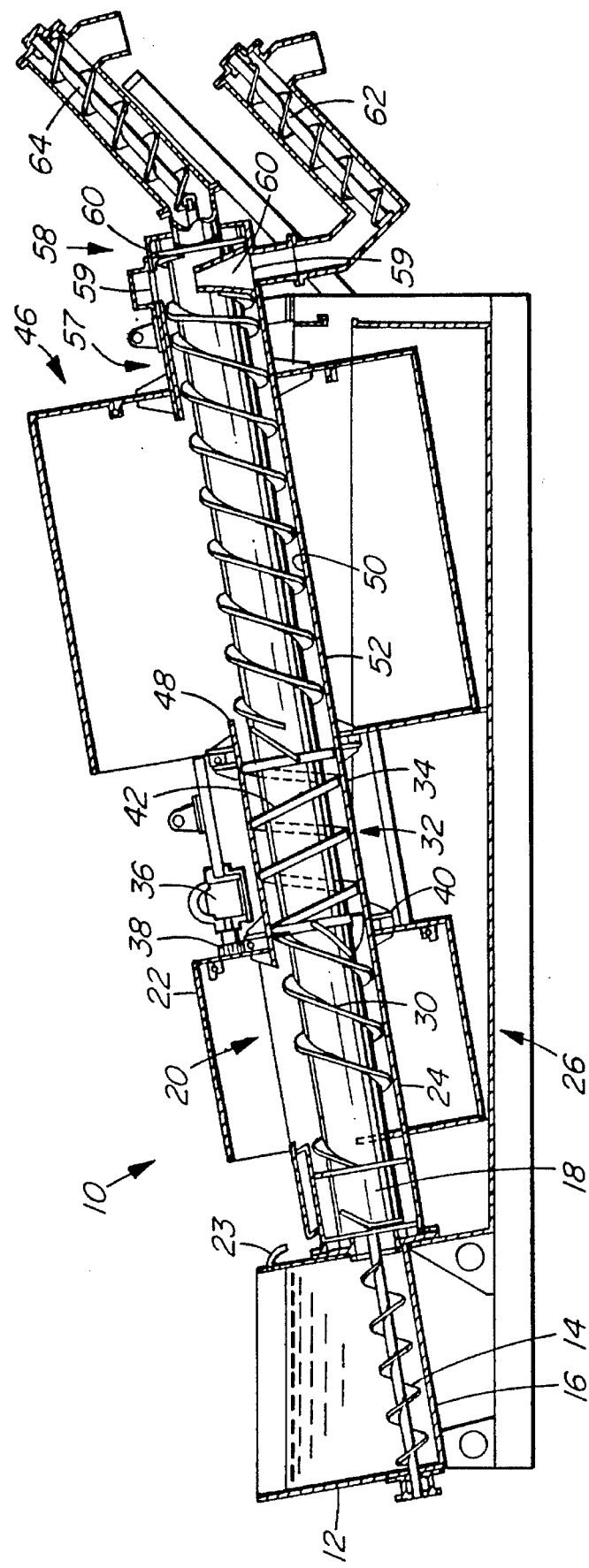
FIG. 1 shows a view in vertical longitudinal cross-section through a dewatering, compacting and extruding machine forming part of the preferred embodiment of the present invention.

As shown in FIG. 1 of the accompanying drawings, a waste material dewatering, compacting and extruding machine indicated generally by reference numeral 10 has an input end provided with an input tank 12 for receiving a mixture of sand and/gravel or other solid material and water.

An auger 14 is provided for feeding this solid material along a closed semi-cylindrical bottom wall 16 of the hopper 10 into the hollow interior of a cylindrical tube 18, which forms part of another auger indicated generally by reference numeral 20.

The auger 20 extends through a screen or basket 22, which is formed of coaxial and axially spaced endless bars, as described in grater detail below, and which is intended to receive biological waste material comprising a mixture of solids and liquid from the input tank 12 through an overflow spout 23. The liquid drains through the screen 22, while the solids are retained within the screen 22 by the endless bars and deposited, by rotation of the screen 22, into the auger 20 for conveyance thereby.

The auger 20, within the screen 22, extends along an underlying semi-cylindrical array of bars 24 extending parallel to the axis of the auger 20. Water from the biological waste material fed onto the auger 20 drains through the bars 24 into a tank indicated generally by reference numeral 26. The solids in this biological waste material are retained by the bars 24 and are conveyed along the exterior of the auger tube 18 by helical blades 30 forming parts of the auger 20.

The solid material is fed by the auger 20 into a compactor/chopper section indicated generally be reference numeral 32, which has an external tubular housing 34 mounted for rotation about the tube 18.

An electric motor 36, through a pinion 38, rotates a toothed wheel 40 mounted on one end of the tubular housing 34 for effecting the rotation of the latter and of the screen 22.

Helically-shaped bars 42 are welded to the interior surface of the tubular housing and to the outer peripheral edges of helical cutter blades 44 (FIG. 2), which in turn are welded to the exterior surface of the tube 18. In this way, rotational drive is imparted from the external tubular housing 34 to the tube 18 and, thus, to the entire auger 20, as well as the cutter blades 44.

Figure 2:
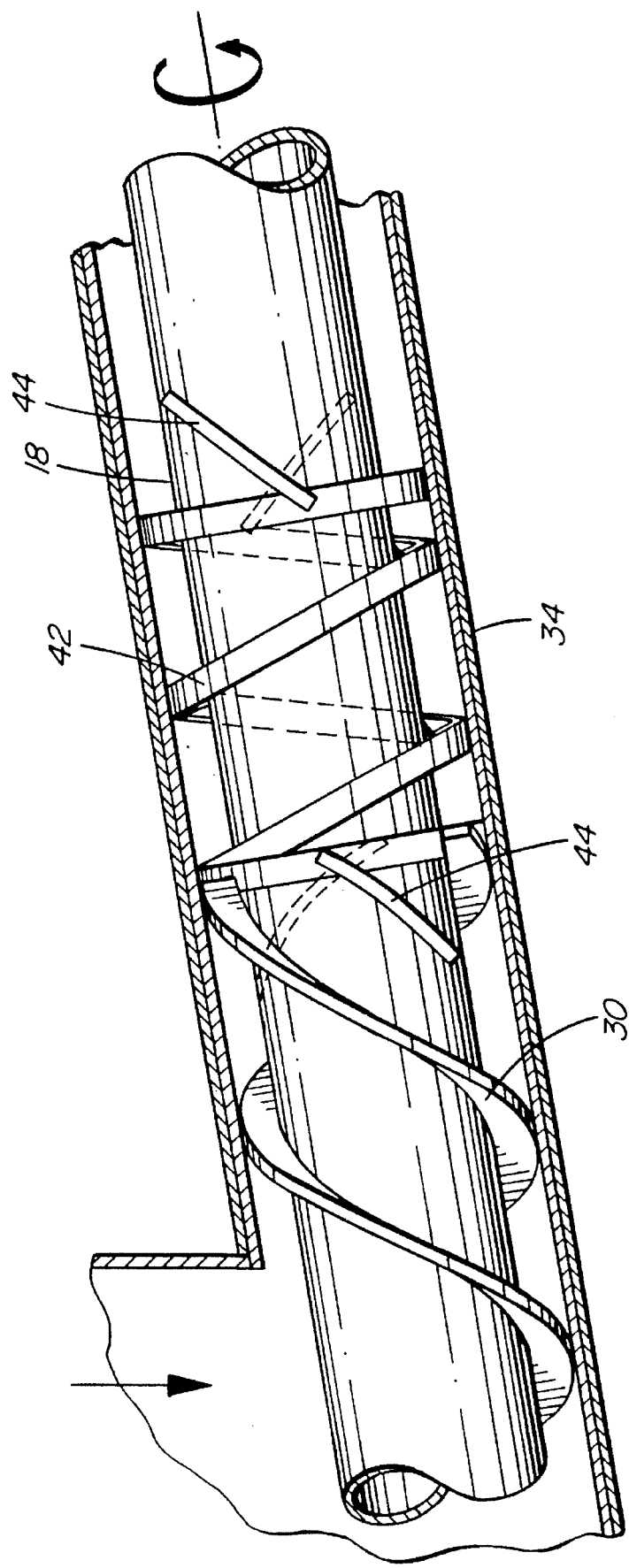
FIG. 2 shows a broken-away view of a modification of a compactor forming part of the machine of FIG. 1.

The compactor/chopper section 32 shown in FIG. 2 differs from that of FIG. 1 in that it is shorter, but it is otherwise similar to that of FIG. 1.

The cutter blades 44 are shaped to effect axial compression and compaction of the solid material fed thereto by the auger 20, while simultaneously chopping the thus-compacted solids.

The compacted and chopped solids are forced from the compactor/chopper section 32 into a portion of the auger 20 extending through a second screen indicated generally by reference numeral 46.

Within the second screen 46, a section of the tube 18 provided at its top with an opening 48 extends along an underlying semi-cylindrical array of longitudinally extending, and laterally spaced, straight bars 50, which are parallel to the axis of the tube 18. A semi-cylindrical micro-screen 52 underlies the bars 50.

Sludge fed into the hopper 48 is mixed with the solids being fed along the tube 18, and the resulting mixture is drained through the micro-screen 52.

The screen 46 has peripheral micro-screens 54 extending around the exterior of co-axial, axially spaced screen bars 56 (FIG. 5), and receives liquid from the tank 26. By means of the micro-screen 54, fine solids are separated from this liquid and deposited onto the auger 20, as described in greater detail below. These fine solids may, for example, be solids small enough to have fallen downwardly through the bars 24 in the screen 22.

The compaction of the solids by the compactor/chopper section 32 forms a relatively tight mass of compacted material which prevents liquid from draining downwardly along the tube 18 into the compactor/chopper section 32 from the hopper 48.

From the section of the auger 20 within the second screen 46, the mixture is advanced along the tube 18 into a second compactor section indicated generally by reference numeral 57, in which the turns of the helical auger blades 30 are spaced more closely together so as to compact the material conveyed thereby.

From the compactor 57, the compacted material passes into an extruder indicated generally by reference numeral 58.

The extruder 58 has a pair of compactor rotors 60 secured to opposite sides of the tube 18 and each being shaped to extrude the material radially outwardly through slot-shaped openings 59 in a cylindrical housing 60. The material is thus extruded into a relatively thick strip-shaped extrusion, which repeatedly breaks across the width of the extrusion to form substantially brick-shaped pellets or extrusion portions.

These extrusion portions are removed in an upwardly inclined direction by an auger 62, and the sand, gravel and the like fed through the tube 18 by the auger 14 is likewise removed by an auger 64 extending parallel to the auger 62.

Figure 5:
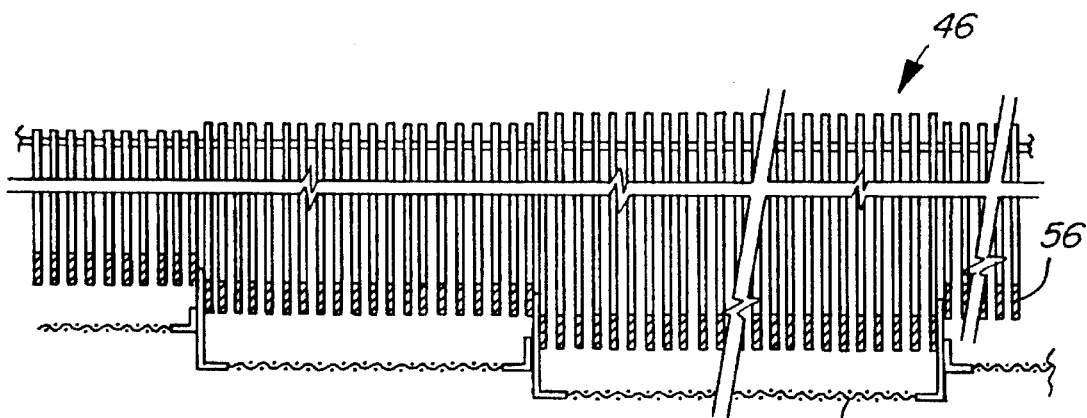
FIG. 5 shows a view in section through parts of the screen of FIG. 4.

As shown in FIG. 5, which is a broken-away view in vertical cross-section through a part of the second screen 46, the screen bars 56 are provided in three different sizes, which are grouped in sets so as to present a series of steps along the axial length of the screen. Such a formation has been found to promote the separation of the solids and the liquids by more securely retaining the solids on the inner peripheries of the bars 56.

Figure 4:
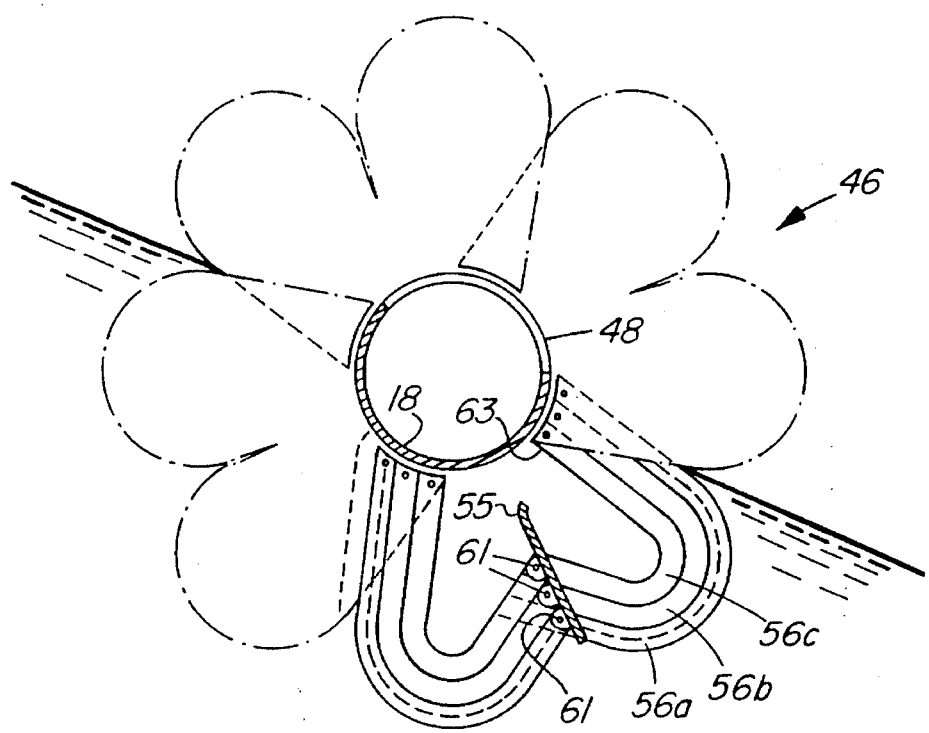
FIG. 4 shows a diagrammatic end view of parts of a screen forming part of the apparatus of FIG. 1.

The shape of the bars 56 is illustrated in FIG. 4, which shows bar components 56a–56c of three different sizes, which are each in the general shape of a J and which are connected together in opposed pairs, by means of longitudinal rods 61, to form radially inwardly open recesses 63.

A radially and longitudinally extending plate 55, which is mounted on the rods 61, protrudes into each recess 63 and serves as a scoop for directing the solid waste material, which collects on the bars 56, into the longitudinally extending opening 48 in the top of the cylindrical tube 18 containing the auger 20.

Figure 6:
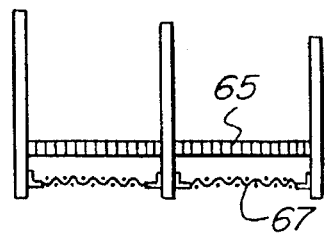
FIG. 6 shows a broken-away view in longitudinal cross-section through parts of another screen of the apparatus of FIG. 1.

The screen 22, of which a broken-away portion is shown in FIG. 6, is constructed of bars 65 which are similar in shape to that of the bars 56 of the screen 46, and which are provided externally of the bars 65 with a microscreen 67 extending peripherally of the screen 22.

Figure 3:
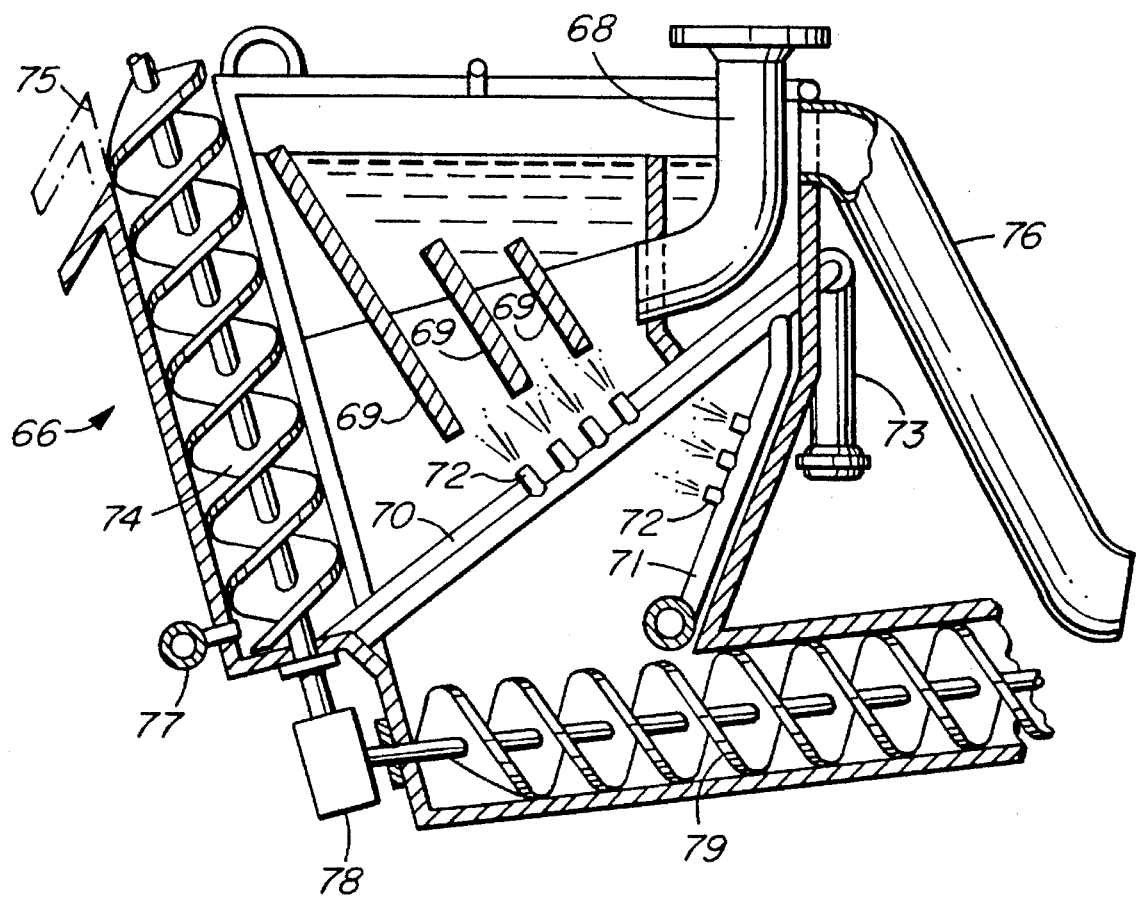
FIG. 3 shows a view taken in vertical cross-section through a modification of an input tank of the machine of FIG. 1.

The modification of the input tank 12, illustrated in FIG. 3 and indicated generally by reference numeral 66, has an input pipe 68 for the inflow of the waste material, and spaced baffles 69 which cause floating material to rise and sand to fall within the tank 66. Beneath the baffles 69, air input pipes 70 and 71 are provided with air discharge nozzles 72 for aerating the contents of the tank and causing the floating material to rise. The air is supplied through an inlet pipe 73, and the pipes 70 form a grid for catching large rocks and other large solid objects and deflecting them to an auger 74. The auger 74 extends up one end of the tank. An output pipe 76 directs the liquid and floating waste material into the tank 26. An air outlet 77 discharges air into the auger 74 for removing floating material and sand from the auger 74. A common drive 78 rotates the auger 74 and also an auger 79, which replaces the auger 14 of FIG. 1 and thus serves to remove sand from the bottom of the tank 66 to the interior of the tube 18.

Figure 7:
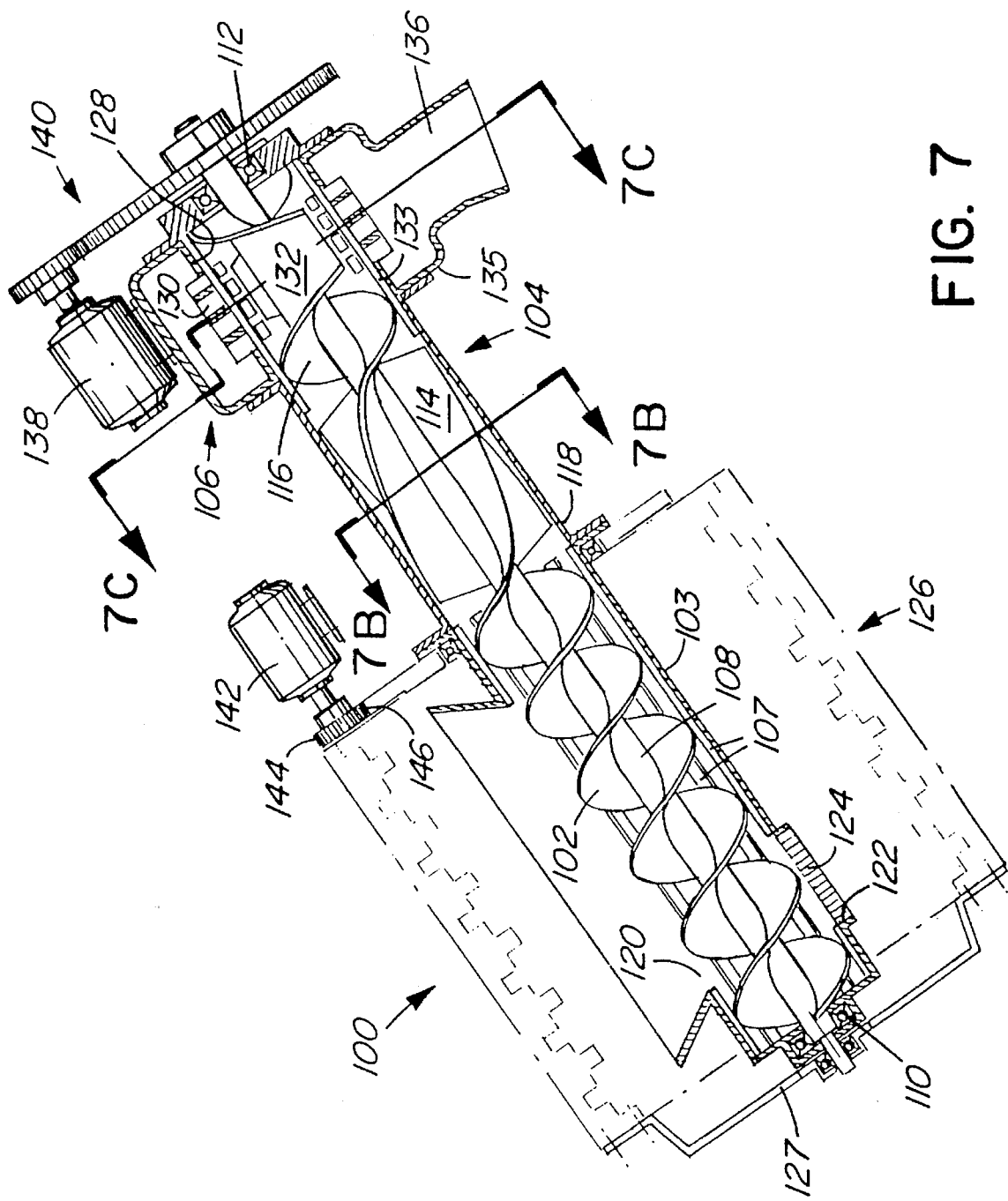
FIG. 7 shows a view in vertical cross-section through apparatus according to another embodiment of the present invention.
Figure 7C:
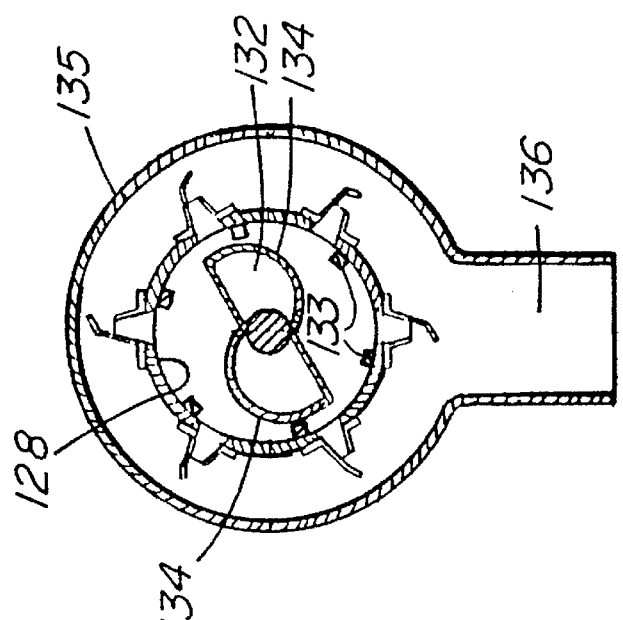
FIGS. 7B and 7C show views taken in cross-section along the lines 7B—7B and 7C—7C of FIG. 7.
Figure 7B:
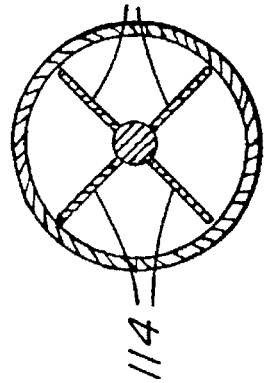

FIG. 7 shows a further apparatus for separating waste liquids and solids, which is indicated generally by reference numeral 100.

The apparatus 100 has a double-flight auger 102, which is rotatable within a cylindrical tube or housing 103, a compactor indicated generally by reference numeral 104 and an extruder indicated generally by reference numeral 106.

Rails 107 extend longitudinally of the inner surface of the tube 103, between the tube 103 and the auger 102, and are equiangularly distributed around the auger 102. These rails 107 serve to shear and guide the solid material conveyed by the auger 102.

The auger 102 has a shaft 108, which is journaled at opposite ends in bearings 110 and 112. The bearing 110 is mounted on the lower end of the tube 103 and the bearing 112 is mounted on the extruder 106.

The compactor 104 has four screw flights 114 extending from the auger 102 to a single flight 116 at the inlet end of the extruder 106. The flights 114 are rotatable within a tube or housing 118 which forms an extension of the tube 103 and which, together with the tube 103, forms an upwardly inclined passage through which the waste material is conveyed by the auger 102.

The tube 103 is formed, at the lower end of this passage and at the top of the tube 103, with an inlet opening 120 for the deposition of the waste material into the auger 102.

The underside of the tube 102 is formed with a drainage opening 122 having bars 124 forming a grating over the drainage opening 122.

Figure 7A:
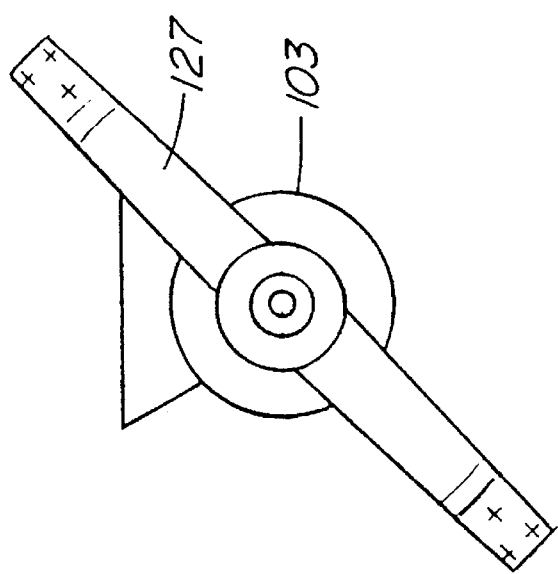
FIG. 7A shows a view in end elevation, in the direction of arrow A of FIG. 7, of parts of the apparatus of FIG. 7.

The tube 103 may be surrounded by a screen shown in broken lines in FIG. 7 and indicated generally by reference numeral 126. The structure of the screen 126 is described in greater detail below with reference to FIGS. 12–14. The screen 126 is rotated by a cross-bar 127 (FIG. 7A) which is fixed to the shaft 108.

However, the screen 126 may be omitted in cases where an initial screening of the waste material, before the waste material is introduced into the auger 102, is not required.

The extruder 106 has a cylindrical wall 128 formed with extrusion openings 130. Within the cylindrical wall 128, a rotor 132 is mounted on the shaft 108 for rotation therewith, and the rotor 132 has a pressure surface 134 which is shaped to press the compacted solid waste material radially outwardly through the extrusion openings 130 to form the solid material into extrusions.

Rails 133 are spaced around the inner surface of the wall 128 for shearing the solid material.

A housing 135 surrounds the cylindrical wall 128 and the extrusion openings 130 and serves to collect the extrusions. The housing 135 has an outlet passage 136 at its underside, through which the extrusions may be deposited, for example, into a suitable container (not shown).

The shaft 108 is rotated by an electric motor 138, mounted on the housing 135, through a reduction gear train indicated generally by reference numeral 140.

The screen 126, when employed, is rotated by an electric motor 142 which is mounted on any suitable support (not shown) and has a pinion 144 meshing with a ring gear 146 fixed to the screen 126.

Figure 8:
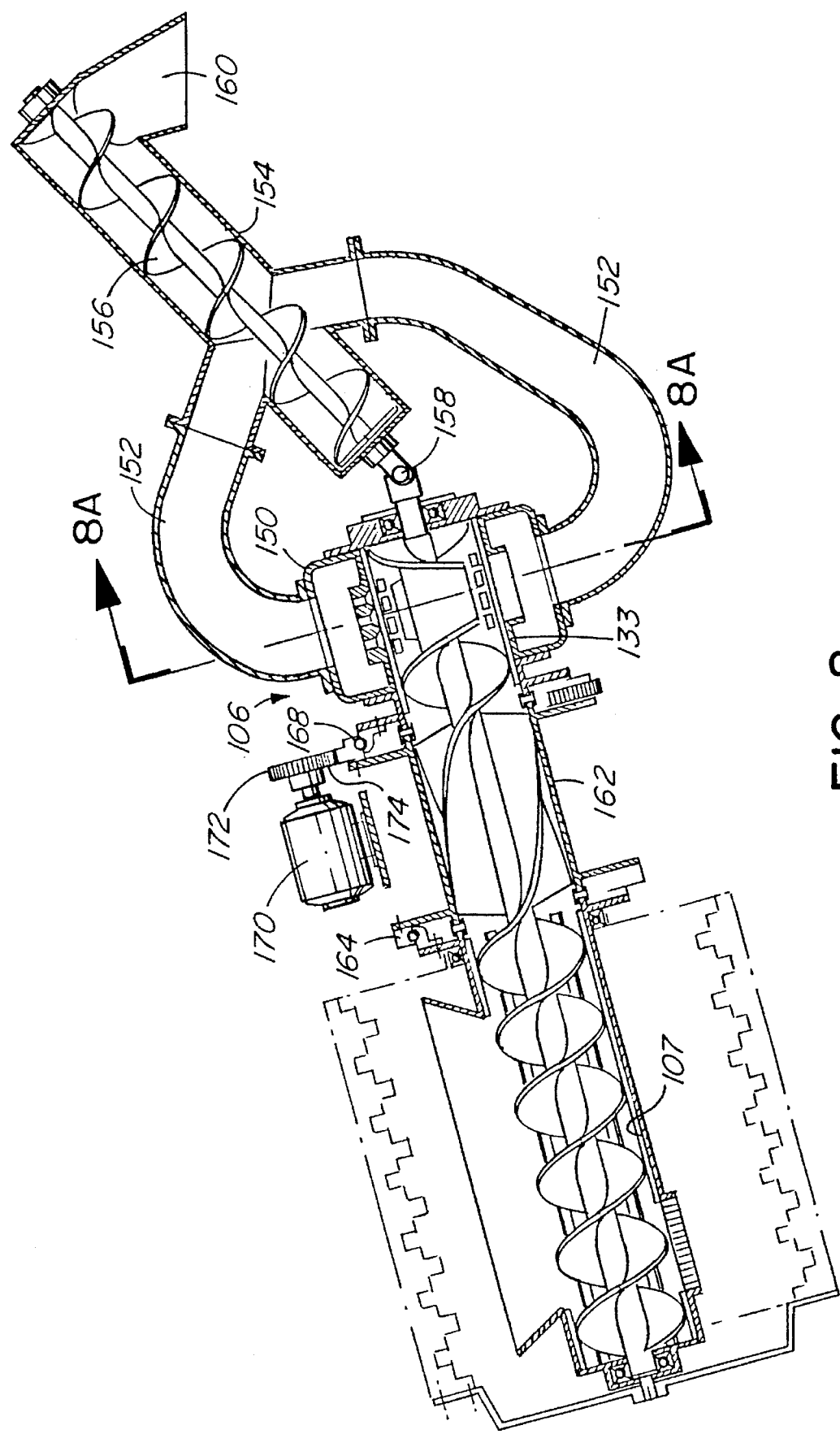
FIG. 8 shows a view in vertical cross-section through an apparatus according to a further embodiment of the invention.

FIG. 8 shows the apparatus 100 of FIG. 7 equipped with a modification of the housing 134 and outlet passage 136. As shown in FIG. 8, the extruder 106 has a housing 150 for collecting the extruded waste material. Instead of a single outlet passage, the housing 150 has six circumferentially spaced outlet passages 152 (FIG. 8A). The outlet passages 152 are smoothly curved and connect the housing 150 to a cylindrical outlet tube 154, which contains an auger 156. The shaft 108 is connected to the auger 156 by a universal joint 158 for transmitting drive to rotate the auger 156 so as to convey the extruded material upwardly along the tube 154 to an outlet 160 extending downwardly from the upper end of the tube 154.

In this embodiment of the invention, the tube 118 is replaced by a tube 162, which is rotatably supported at opposite ends on bearings 164 and 168 provided on the tube 103 and the extruder 106, respectively. The tube 162 is rotated by an electric motor 170, through a pinion 172 on the output shaft of the electric motor 170 and a ring gear 174 on the tube 162. The tube 162 is fixed to the flights 114 of the compactor 104, which transmit the rotation to the shaft 108.

Figure 8C:
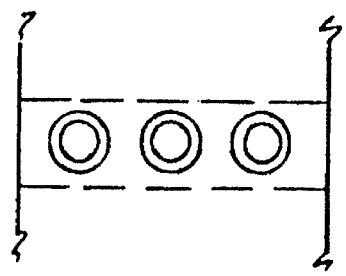
FIGS. 8B and 8C show the shapes of alternative extrusion openings in the apparatus of FIG. 8.
Figure 8B:
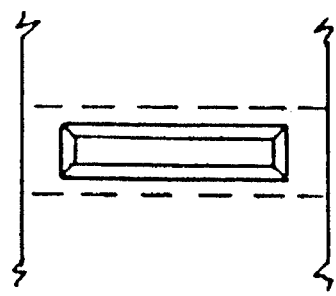
Figure 8A:
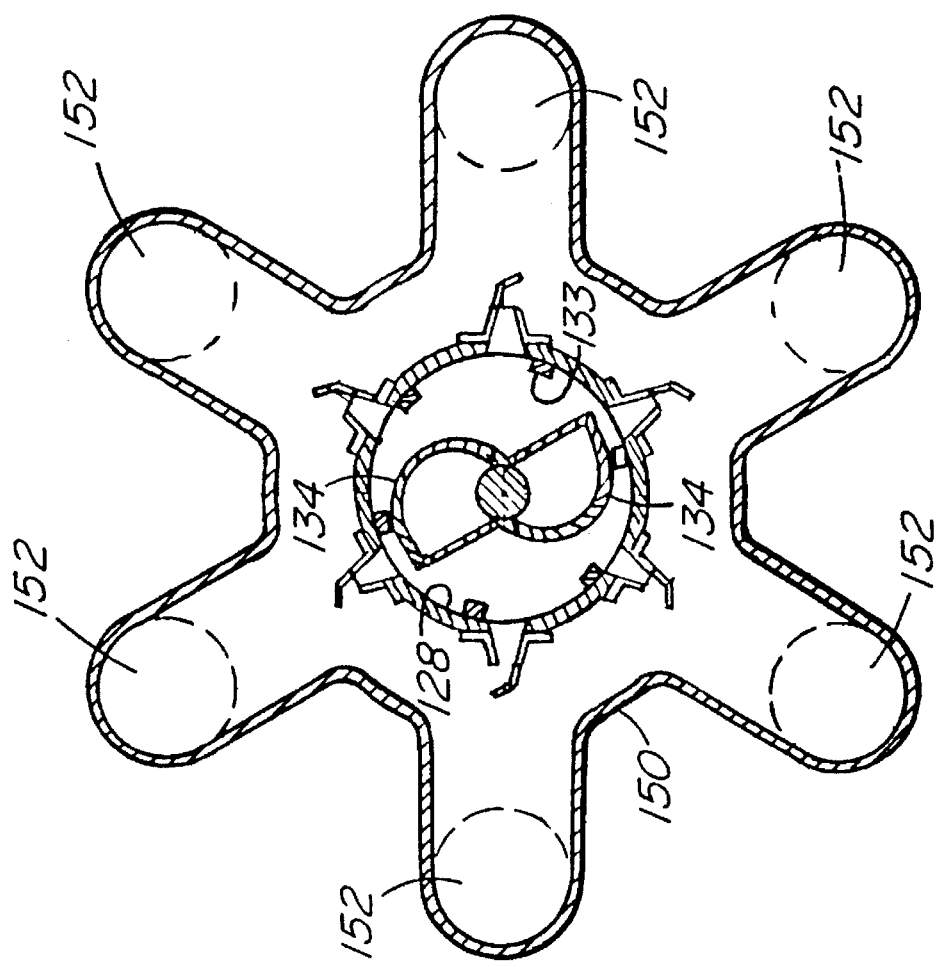
FIG. 8A shows a view taken in cross-section along the line 8A—8A of FIG. 8.

The extrusion openings of the extruders 106 of FIGS. 7 and 8 may have an elongate or slot shape, as illustrated by the opening 130A of FIG. 8B, or a circular shape, as illustrated by the openings 130B of FIG. 8C.

Figures 9, 9A:
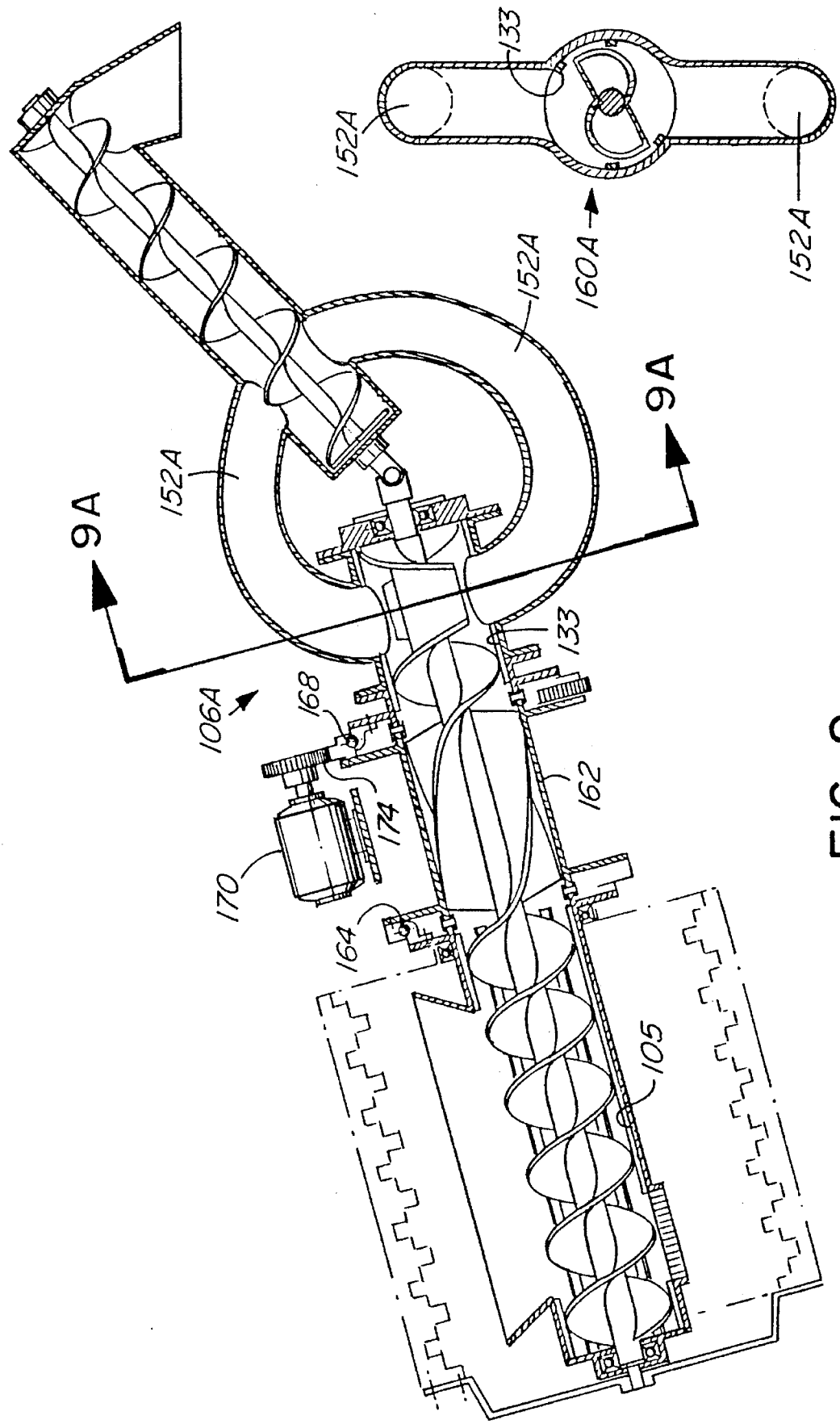
FIG. 9 shows a view in vertical cross-section through a modification of the apparatus of FIG. 8.
FIG. 9A shows a view taken in cross-section along the line 9A—9A of FIG. 9.

In the apparatus shown in FIGS. 9 and 9A, which is a modification of the apparatus of FIGS. 8 and 8A, the six outlet passages 152 are replaced by two outlet passages 152A, which extend from the top and bottom, respectively, of an extrusion section indicated generally by reference numeral 106A, which replaces the extruder section 106.

Figure 10:
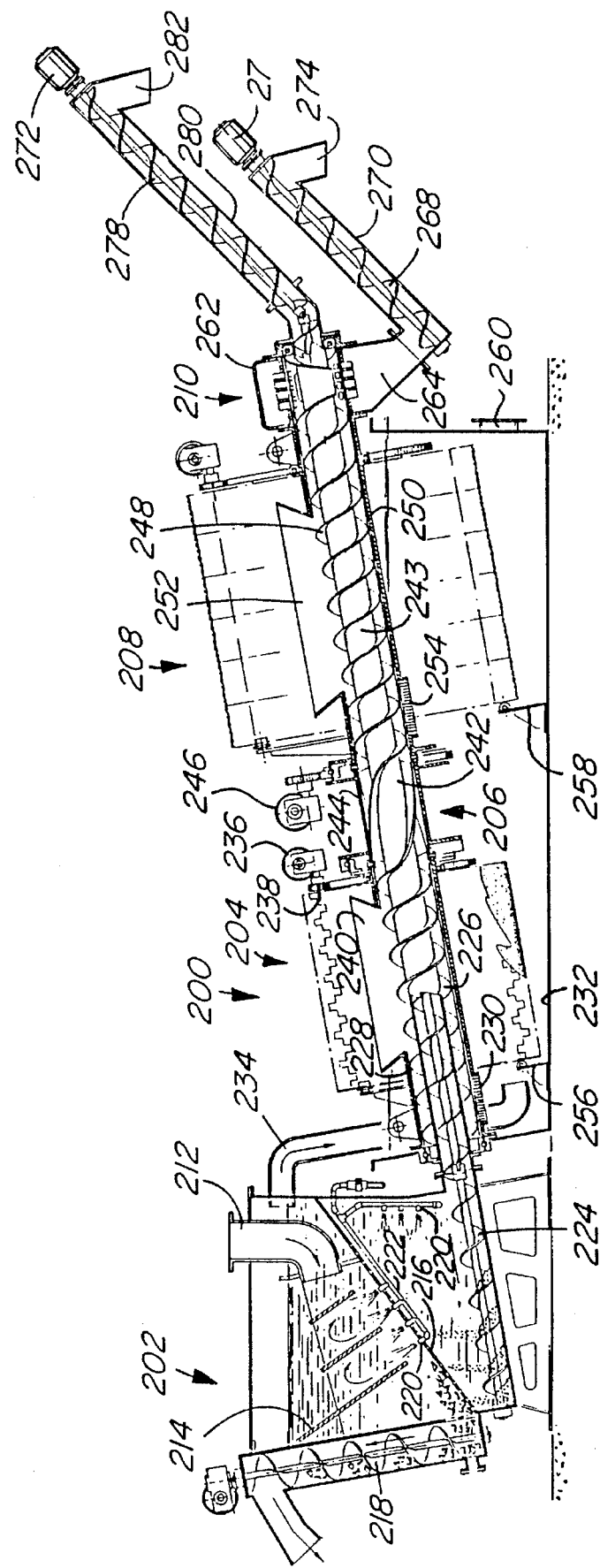
FIG. 10 shows a view in vertical cross-section through a modification of the apparatus of FIG. 1.

FIG. 10 shows a modification of the apparatuses of FIGS. 1 and 3. In the apparatus of FIG. 10, which is indicated generally by reference numeral 200, an inlet or settlement tank or container is indicated generally by reference numeral 202; a first screen by reference numeral 204; a compactor by reference numeral 206; a second screen by reference numeral 208 and an extruder by reference numeral 210.

The settlement tank 202 has an inlet pipe 212 through which a mixture of waste liquid and solid material is introduced into the tank 202, and a series of inclined baffles 214 extending across the interior of the tank 202. Beneath the baffles 202, an inclined grating 216 slopes downwardly to the bottom of an upwardly inclined auger 218. The grating 216 served to deflect relatively large solid object toward the auger 218 for separate removal from the tank 202.

Beneath the grating 216, nozzles 220, supplied through piping 222, discharge water or air into the interior of the tank 202 for agitating and, if required, aerating the mixture.

Solid material which falls to the bottom of the tank 202 is removed by an auger 224 extending along a bottom portion of the tank 202.

The auger 224 extends upwardly inclined from the tank 202 through an auger 226.

The auger 226 is rotatable in an upwardly inclined passage formed by a tube 228, which extends through the screen 204. The lower end of the tube 228, at the underside of the tube 228, is provided with a drainage grating 230 through which liquid can drain from the auger into a tank 232 adjoining the tank 202. The tank 202 has an overflow pipe 234 through which liquid from the tank 202 flows into the tank 232 and, thereby, through an open end of the screen 204 into the interior of the screen 204.

The screen 204 is rotated about the auger 226 by an electric motor 236, which drives a ring gear 238 on the screen 204. The rotation of the screen 204 carries solid material, which collects in the interior of the screen 202, upwardly beyond the surface level of the liquid in the tank 232, and then deposits this solid material into the auger 226 through an inlet opening 240 in the top of the tube 228.

The solid material is conveyed by the auger 226 into the compactor 206, which has flights 242 for compacting and conveying the solid material.

The flights 242 are fixed to a tube 243 to which the flights of the auger 226 are also fixed. The tube 243 contains the auger 224. The flights 242 are also fixed to an outer tube 244, which is rotated by an electric motor 246. The tube 244 is rotatably supported and driven by means which are similar to those used for the tube 162 of FIG. 8.

From the compactor 206, the compacted material is conveyed by a further auger 248 on the tube 246 and passes through the screen 208 in a tube 250 containing the auger 248. The tube 250 has a top inlet opening 252 for the deposition of solid material into the auger 248, and a bottom drainage grating 254 for draining liquid from this solid material.

The tank 232 has a first weir 256 in sealing engagement with a lowermost portion of the screen 204 for deflecting the flow from the overflow pipe 234 into the interior of the screen 204, and a second weir 258 in sealing engagement with the lowermost portion of the screen 208 for deflecting the liquid drained through the screen 204 into the interior of the screen 208. The liquid drained through the screen 208 flows out through an outlet pipe 260.

Beyond the screen 208, the solid material conveyed by the auger 248 passes into the extruder, which is similar to the extruder 106 of FIG. 7, and the extruded material from the extruder 210 is discharged into a housing 262, which has an outlet 264 for directing the extruded material into the lower end of an auger 268.

The auger 268 is rotated in a tube 270 by an electric motor 272 and discharges the extruded waste material through a downwardly directed outlet pipe 274.

The auger 224 extend co-axially through the auger 226, the compactor 206, the auger 248 and the extruder 210 and, at its upper end, is connected by a universal joint 276 to the lower end of an auger 278.

The auger 278 is rotated in a tube 280 by an electric motor 272 and discharges through a downwardly directed outlet 282 at the upper end of the tube 280.

Figure 11:
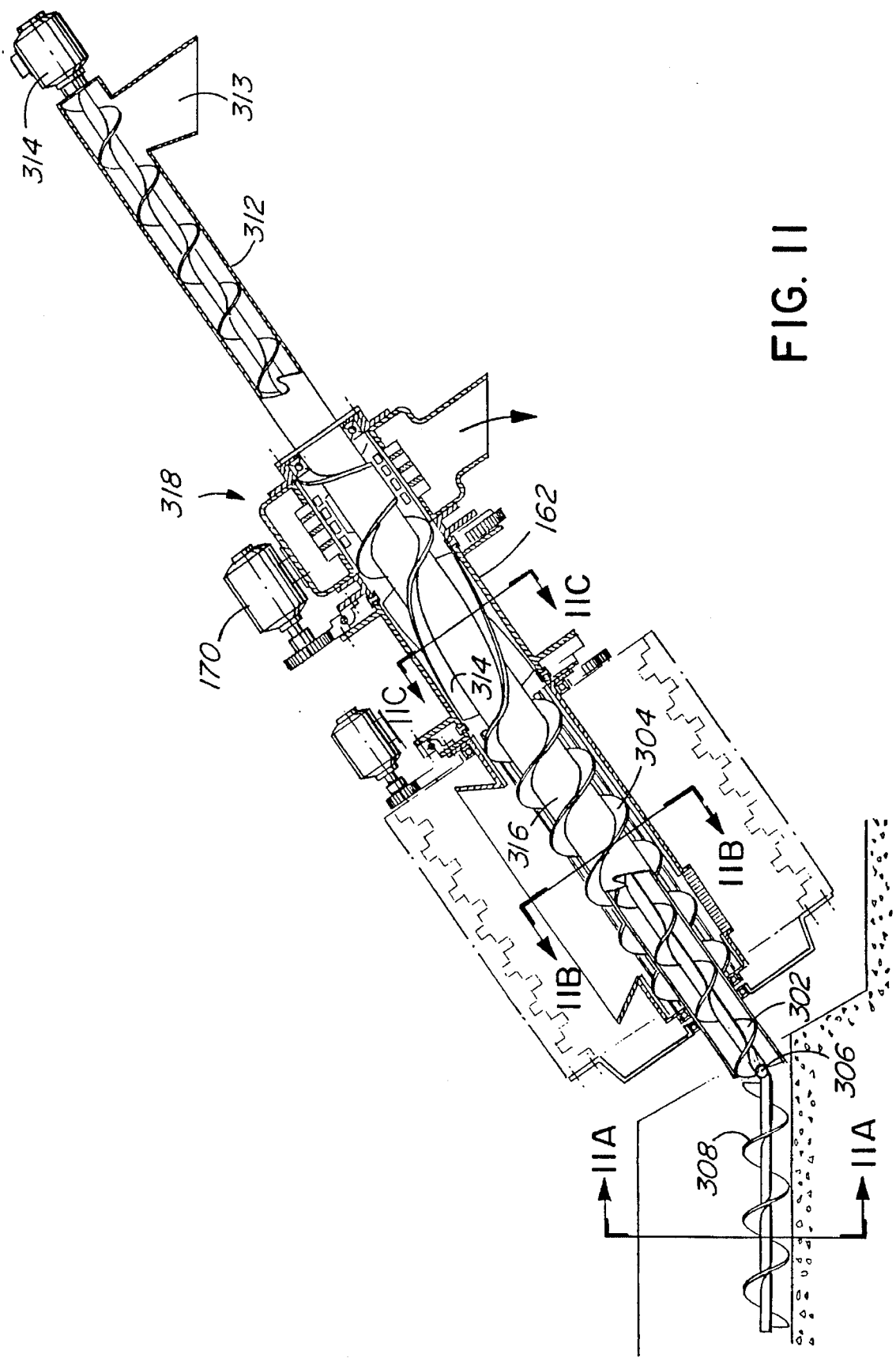
FIG. 11 shows a view in vertical cross-section through apparatus according to a still further embodiment of the present invention.
Figure 11C:
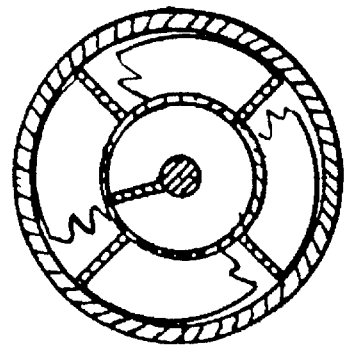
FIGS. 11A, 11B and 11C show views taken in cross-section along the lines 11A—11A, 11B—11B and 11C—11C of FIG. 11, respectively.
Figure 11B:
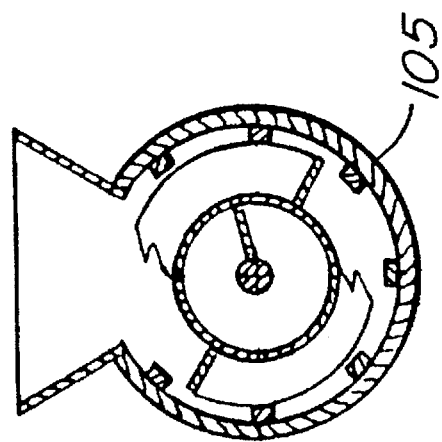

FIGS. 11 through 11C show another apparatus for separating solids and liquids, which is indicated generally by reference numeral 300 and is a modification of the apparatus of FIG. 8. Accordingly, to simplify the description of FIGS. 11 through 11C, the same reference numerals are used to identify parts which are the same as those of FIG. 8 and these parts will therefore not be described again.

Figure 11A:
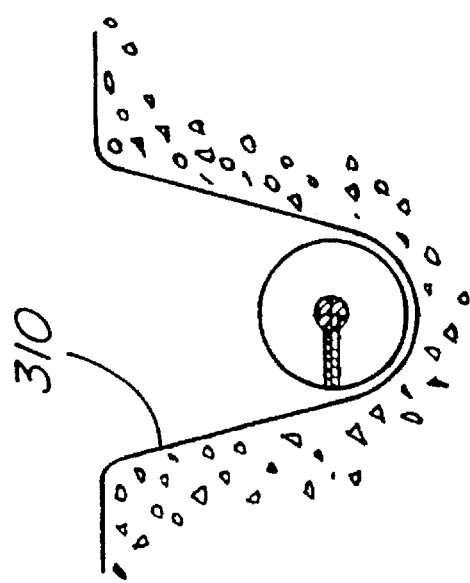

In the apparatus 300 of FIG. 11, however, the single auger of FIG. 8 has been replaced by co-axial augers 302 and 304. The innermost auger 302 is connected at its lower end, by a universal joint 306, to an auger 308 which, as shown in FIGS. 11 and 11A, extends along the bottom of a concrete channel 310.

The upper end of the auger 302 extends through a tube 312 to a drive motor 314, which rotates the auger 302 and the tube 312 has an outlet 313 for discharging material conveyed by the auger 302.

The upper end of the outer auger 304 is connected to compressor flights 314, which correspond to the flights 244 of FIG. 10 and are fixed to the tube 162 and also to a tube 316 in which the auger 302 rotates. The flights of the outer auger 304 are also fixed to the tube 316, for rotation by the motor 170 through the tube 162.

The apparatus 300 also includes an extruder section 318 which is indicated generally by reference numeral 318 and is similar to the extruder section 106 of FIG. 7.

FIGS. 12 through 14 show parts of a screen which may be used as the screen 100 of FIG. 7 or the corresponding screen in the apparatuses of FIGS. 8 through 11.

As shown in FIGS. 12 and 14, the screen is formed by axially spaced bars 400, which are connected together by nuts 402 in threaded engagement with the ends of rods 404 extending through the bars 400 and through end plates 406 and 408 at opposite ends of the screen.

The bars 400 form radially inwardly open pockets or spaces 409 for receiving the mixture of solids and liquids, and are arranged in groups of different sizes, which vary along the length of the screen as shown in FIG. 12.

Figure 16:
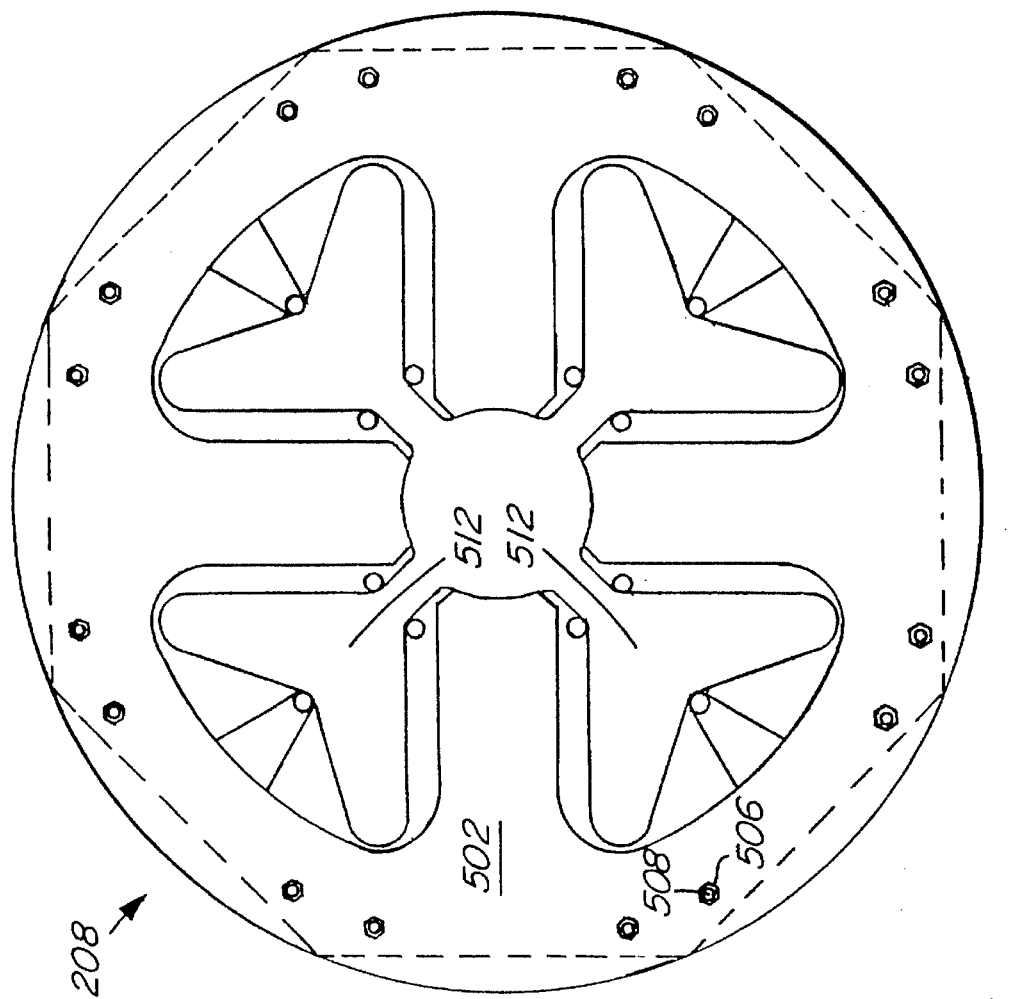
FIG. 16 shows a view in end elevation of the micro-screen of FIG. 15.
Figure 15:
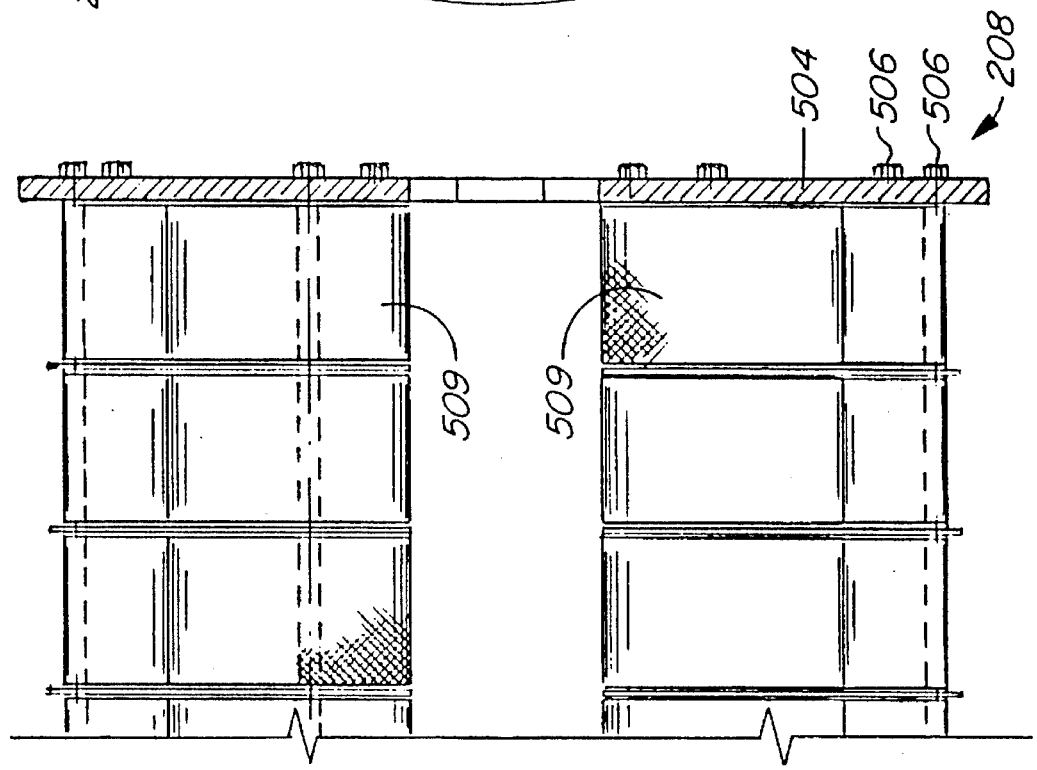
FIG. 15 shows a broken-away view in longitudinal cross-section through parts of a micro-screen for use in the apparatuses of FIGS. 1 through 11.

FIGS. 15 and 16 show parts of the micro-screen 208 of FIG. 10, which include end plates 502 and 504 secured together by nuts 506 in threaded engagement with rods 508 and a micro-screen mesh 509 extending around rods 510 and forming radially inwardly directed pockets or recesses 512 for receiving the mixture to be screened.

I claim:

1. Apparatus for separating solid material and liquid, comprising:

an upwardly inclined cylindrical passage;

said cylindrical passage having a lower end and an upper end;

an auger in said cylindrical passage for conveying the solid material upwardly along said cylindrical passage;

an inlet opening at said lower end of said cylindrical passage for receiving a mixture of the solid material and liquid into said auger;

at least one radial outlet opening at an upper end of said cylindrical passage; and a compactor rotor in said cylindrical passage at said upper end of said cylindrical passage;

said compactor rotor having a pressure surface facing radially outwardly of said cylindrical passage for pressing the solid material radially outwardly through the said radial outlet opening;

said auger comprising a lower first auger section and an upper second auger section;

said apparatus further comprising a compactor within said cylindrical passage between said first and second auger sections, a first screen which is rotatable about said first auger section for screening the solid material and depositing the screened solid material into said first auger section, and a second screen which is rotatable about said second auger section for further screening the liquid screened by said first screen and depositing solid material screened therefrom into said second auger section.

2. Apparatus as claimed in claim 1, wherein said radial outlet opening is one of a plurality of extrusion openings communicating radially with said cylindrical passage for extruding the solid material pressed radially outwardly by said compactor rotor.

3. Apparatus as claimed in claim 1, wherein said compactor rotor is one of at least two similar compactor rotors which are equiangularly distributed about an axis of rotation thereof.

4. Apparatus as claimed in claim 1, further comprising at least two outlet passages distributed around said upper end of said cylindrical passage and communicating therewith for receiving the solid material pressed radially outwardly by said compactor rotor.

5. Apparatus as claimed in claim 1, further comprising a compactor in said cylindrical passage for compacting the solid material as the solid material travels along said cylindrical passage.

6. Apparatus as claimed in claim 5, wherein said compactor comprises screw flights extending from said auger and having a screw pitch greater than that of said auger.

7. Apparatus as claimed in claim 1, further comprising a further auger for receiving and conveying the solid material pressed through said outlet opening by said compactor rotor, said further auger being upwardly inclined at an angle of inclination greater than that of said cylindrical passage.

8. Apparatus as claimed in claim 7, further comprising a drive connection between said first-mentioned auger and said further auger.

9. Apparatus as claimed in claim 1, further comprising a further auger for receiving and conveying the solid material pressed from said cylindrical passage by said compactor rotor, and at least two outlet passages distributed around said upper end of said cylindrical passage and communicating with said cylindrical passage and with said further auger for guiding the solid material from the former to the latter.

10. Apparatus as claimed in claim 9, further comprising a drive connection between said first-mentioned auger and said further auger.

11. Apparatus as claimed in claim 1, including a further auger extending co-axially through said first-mentioned auger and through said compactor rotor, said further auger projecting downwardly beyond said lower end of said cylindrical passage.

12. Apparatus as claimed in claim 1, further comprising an inlet opening in said lower end of said cylindrical passage, a screen extending around said lower end of said cylindrical passage for screening the solid material and depositing the screened solid material into said cylindrical passage through said inlet opening, a drive motor for rotating said screen around said cylindrical passage and a drive transmission axially connected to said auger at said upper end of said cylindrical passage.

13. Apparatus as claimed in claim 12, further comprising a further drive motor connected to said drive transmission for rotating said auger.

14. Apparatus as claimed in claim 12, further comprising a further auger, said drive transmission connecting said first-mentioned auger to said further auger for driving the latter.

15. Apparatus as claimed in claim 14, including outlet passages distributed around said upper end of said cylindrical passage and connecting said cylindrical passage to said further auger.

* * * * *